United States Patent [19]
Gravett

[11] 3,978,445
[45] Aug. 31, 1976

[54] ASW INTERCEPT LOCALIZATION SONAR

[75] Inventor: Gerald F. Gravett, Silver Spring, Md.

[73] Assignee: The United States of America as represented by the Secretary of the Navy, Washington, D.C.

[22] Filed: Nov. 19, 1974

[21] Appl. No.: 525,253

[52] U.S. Cl. ................................ 340/6 R; 307/234; 328/109; 328/111; 340/16 R; 343/100 CL
[51] Int. Cl.² ........................................ G01V 1/00
[58] Field of Search ........... 340/6 R, 16 R, 15.5 CC; 343/100 CL; 328/109, 111, 112; 307/234

[56] References Cited
UNITED STATES PATENTS

| | | | |
|---|---|---|---|
| 3,145,341 | 8/1964 | Andrew | 343/100 CL |
| 3,346,862 | 10/1967 | Raudsep | 340/6 R |
| 3,821,740 | 6/1974 | Ehrlich | 346/6 R |
| 3,893,115 | 7/1975 | Linder | 343/5 DP |

Primary Examiner—Maynard R. Wilbur
Assistant Examiner—S. C. Buczinski
Attorney, Agent, or Firm—R. S. Sciascia; J. A. Cooke; W. W. Cochran

[57] ABSTRACT

A sonar for detecting and localizing sources of high frequency sonar pulses in range and bearing in real time. Three hydrophones pick up sonar pulses and process them in their respective detectors for storing. Detection by all three detectors cause the stored signals to be sent to a cross-correlator computer for range and bearing calculation.

8 Claims, 7 Drawing Figures

ASW INTERCEPT LOCALIZATION SONAR

BACKGROUND OF THE INVENTION

The present invention pertains generally to sonar devices and more particularly to sonar intercept systems for not only distinguishing between sonar signals originating from within vessel itself and outside signals, but also for determining the bearing and range of the source if the signal originates from outside the vessel.

Sonar signals have been used for a number of years to detect the presence of other vessels. Passive sonar systems typically use a single or a small array of hydrophones in an attempt to detect signals from outside sources such as torpedoes. The prior systems however have generally been unable to distinguish between noises originating from the vessel itself and outside signals, a deficiency resulting in a high false alarm rate on board the detecting vessel. This is a result of the necessity of the detector to search for a narrowband signal over a wide frequency range (nominally 100kHz) in a high background noise environment. This background noise around a submarine (platform noises and surrounding biologies) contain many sources of signals with sonar characteristics. Prior art intercept systems attempt to discriminate against the signal itself, generally on a statistical basis, since no other criteria is available for examination. Since they are discriminating against signal which have characteristics similar to those which they are trying to detect, the sensitivity of the system is reduced to a point where the probability of detection is impractically in order to eliminate the high false alarm rate.

Another limitation of the prior art systems is that they lack ranging capability. Since they are entirely passive in nature and their detectors are physically located quite close, the prior art systems cannot distinguish whether the sonar signal originates from several yards or from several hundred yards away. In addition, the detectors' close physical relationship renders poor accuracy to bearing measurements thereby rendering counter-measures by the detecting vessel of limited effect.

Still another limitation of the prior art systems is that they require long signal processing times. As a signal is transmitted by the weapon it is both attenuated and distorted. Therefore, that portion of the signal which is of both sufficient amplitude and fidelity to be of value is normally appreciably less than the total pulse transmitted. Many of these pulses are missed by present equipment and consequently there's no "real-time" capability. The information presented is where the weapon was at some previous time rather than its present location.

SUMMARY OF THE INVENTION

The present invention overcomes the disadvantages and limitations of the prior art by providing an intercept localization sonar device. The system uses three hydrophones spaced as far as possible from each other on the detecting vessel. The system provides a nominal processing time, usually on the order of 200 μsec. In addition, the initial decision logic provides automatic rejection of self noise and nearby biological generated sonar signals. It also provides bearing and range accuracy sufficient for fire control in a totally automated manner in real time.

It is therefore an object of the present invention to provide a device for distinguishing enemy sonar signals.

It is also an object of the present invention to provide a device for distinguishing distant sonar signals from nearby sonar signals.

Another object of the present invention is to provide a device for determining the bearing and range of distinguished enemy sonar signals with accuracy sufficient for countermeasure fire control.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
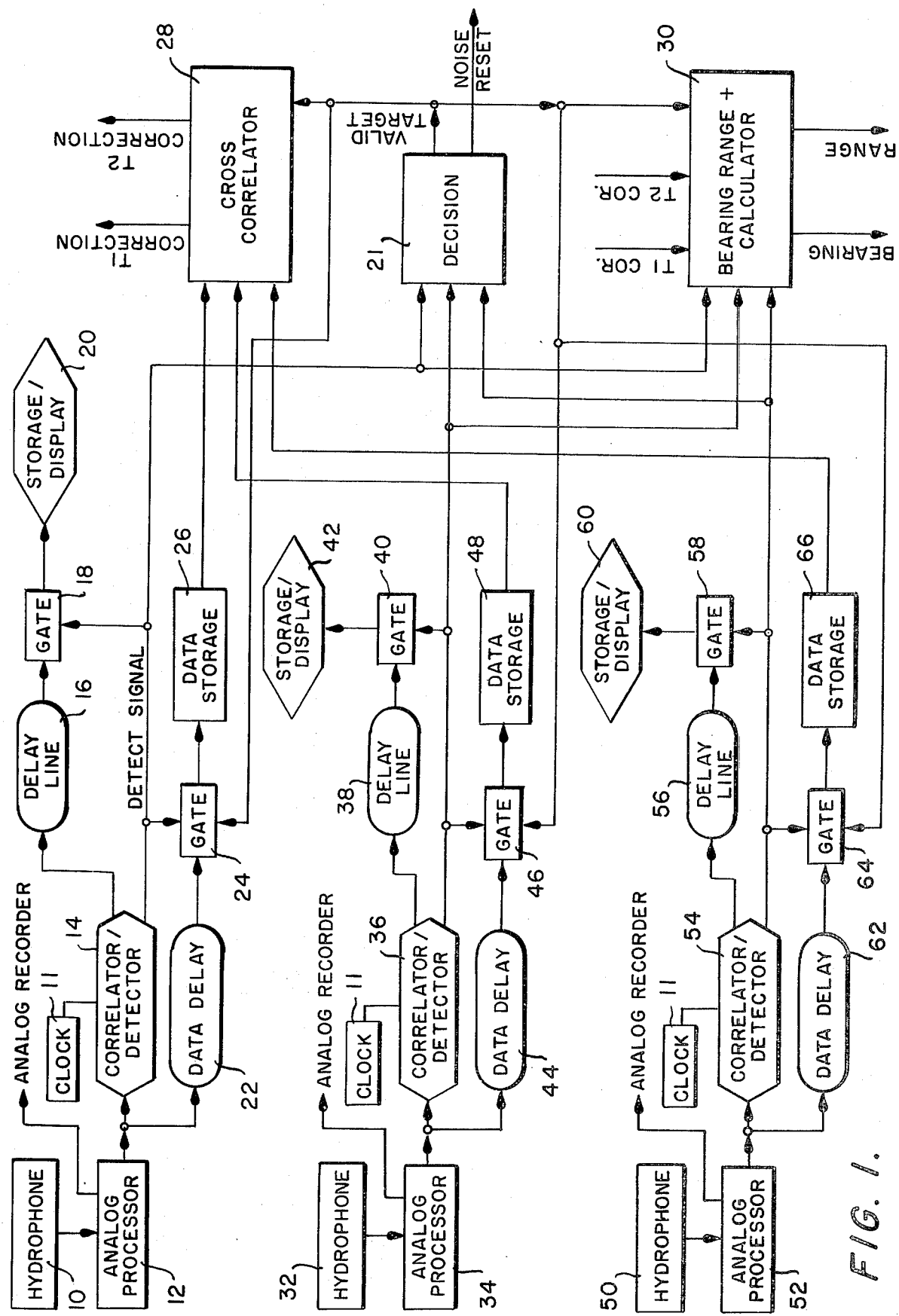
FIG. 1 is a block diagram of the preferred embodiments.
Figure 2:
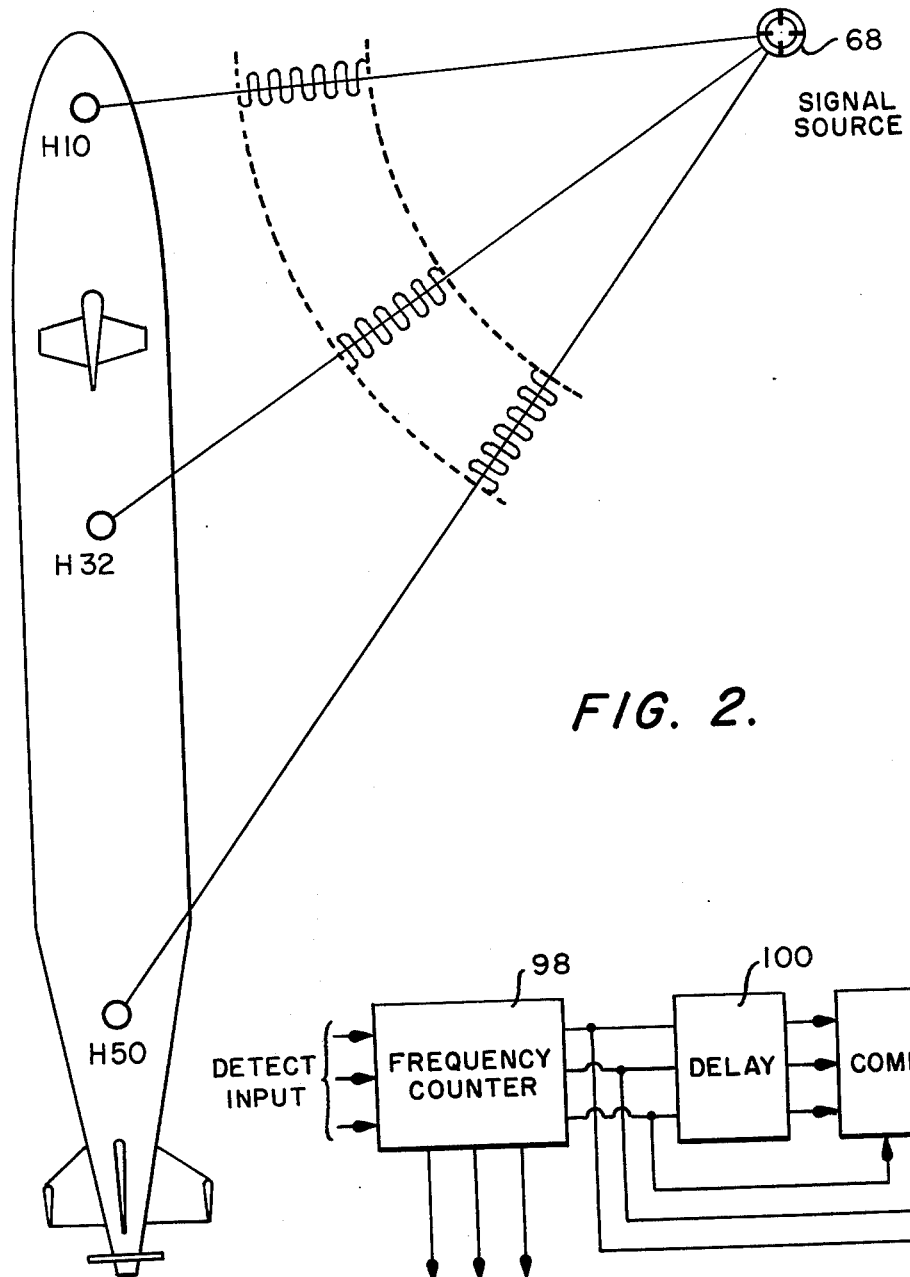
FIG. 2 is a diagram of the arrangement of hydrophones or the vessel and the detection of the signal from the sonar source.

FIG. 1 discloses a block diagram of circuitry comprising the preferred embodiment of the present invention. As shown therein, three hydrophones 10, 32, and 50 are located on a vessel as shown in FIG. 2 for detection of sonar signals. The data from each hydrophone 10,32,50 is processed individually in separate but identical circuitry as shown in FIG. 1. The sequence in which a signal is received at each of the hydrophones 10, 32, 50, and is processed by the corresponding circuits 12–26, 34–48 and 52–66, respectively, is dependent upon the arrangement of and the location of the source of the signal relative to, the hydrophones. For simplicity, the operation of the hydrophones 10, 32, 50 and their respective associated circuits, 12–26, 34–48, 52–66 will be set forth under the convention that a signal is received first by hydrophone 10, second by hydrophone 32, and last by hydrophone 50. The description of circuitry 12–26 for hydrophone 10 will therefore suffice for the identical corresponding circuitry 34–48, 52–66 for hydrophones 32 and 50.

The detected sonar signal from hydrophone 10, 32, 50 is transformed into a digital signal by analog processor 12, 34, 52. The analog data can also be recorded on a analog recorder simultaneously. The digital data is fed to a correlator/detector 14, 36, 54 which autocorrelates the data with itself to eliminate broadband signals and background noise and detect the presence of a sonar signal from the magnitude of the correlated signal.

The clock 11 controls the output of the detect signal to occur at the end of a predetermined period, e.g., 200μsec, upon the detection of a sonar signal. The correlated data is fed through a delay line 16, 38, 56 which cause a delay in the correlated data signal equal to that period (200μsec) such that when a detect signal is produced, the initial sonar data can be transferred to a storage 20, 42, 60 for visual display and inspection via gate 18, 40, 58. The uncorrelated data is also delayed in data delay 22, 44, 62 and gated via logic gate 24, 46, 64 to a permanent data storage 26, 48, 66 upon detection of a sonar signal. This data is stored for possible later use by the cross correlator 28.

The detect signal is also fed to the initial decision logic circuitry 21 which determines the nature of the detected signal, and to the range and bearing calculator 30 to determine the location of the source of the sonar signal.

Figure 6:
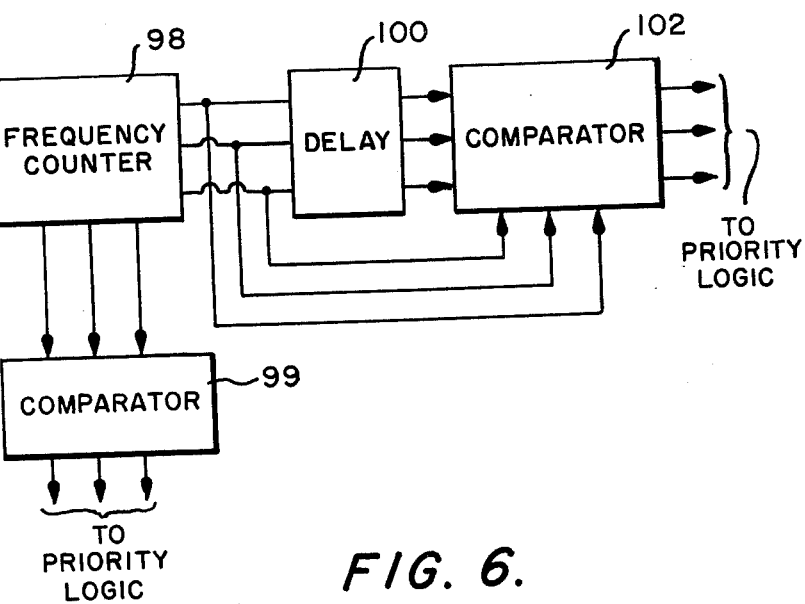
FIG. 6 is a block diagram of the frequency analyser.
Figure 4:
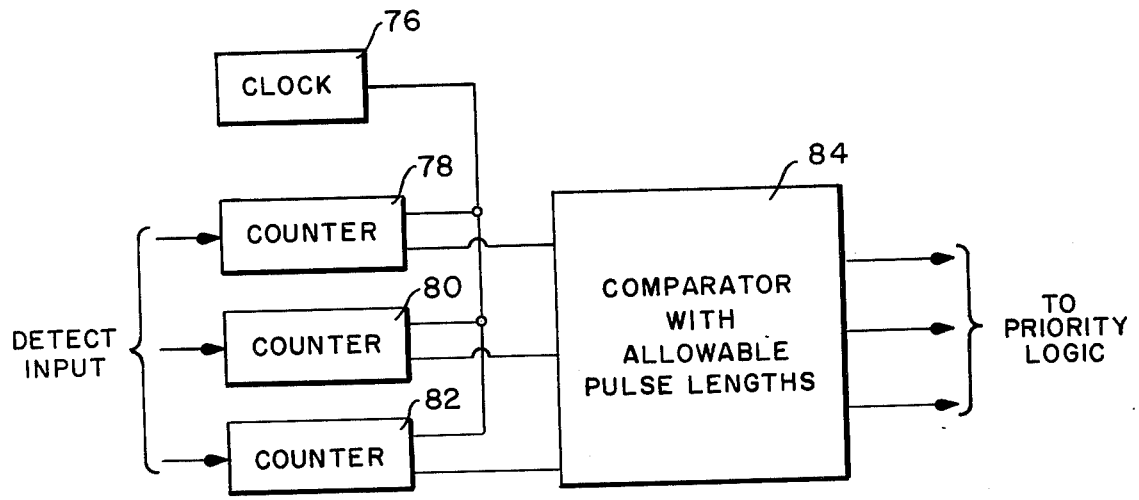
FIG. 4 is a block diagram of the pulse length detector of the initial decision logic.
Figure 5:
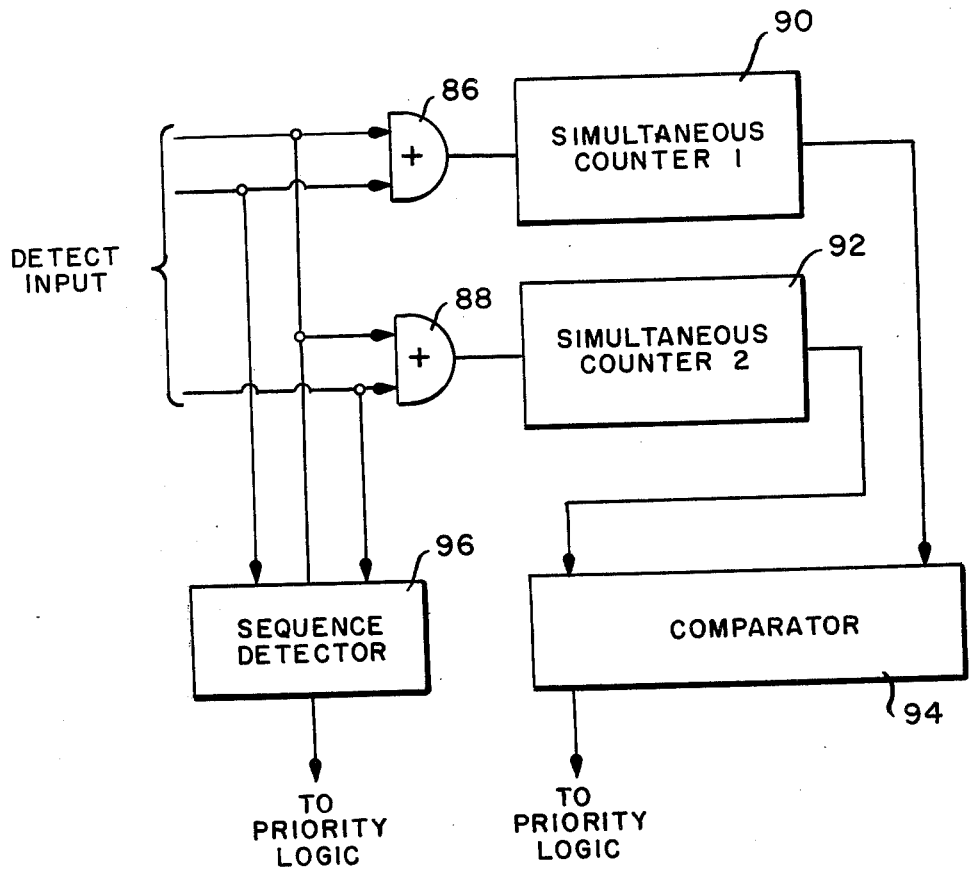
FIG. 5 is a block diagram of the self noise discriminator of the initial decision logic.

The initial decision logic circuitry 21 comprises the circuitry more fully shown in FIGS. 4, 5, and 6. The pulse length detector circuitry of FIG. 4 helps to further distinguish noise signals from the expected sonar signals. The detect signal input is fed to counters 78, 80, and 82 which are controlled by clock 76 to count the length of the input sonar pulse. The length or count is then compared to allowable pulse lengths for each input. Upon favorable comparison, a pulse is produced at the output of comparator 84 for transmission to the priority logic.

FIG. 5 discloses the self noise discriminator circuitry of the initial decision logic for determining whether the pulse originated from within the ship itself or a small sphere surrounding the vessel rather than from an outside source. The detector inputs are fed to both a sequence detector 96 and two "and" gates 86 and 88. The sequence detector uses standard logic circuitry to produce a pulse whenever an unacceptable sequence of pulses is detected to indicate that the pulse has been produced from the vessel itself. For example, sequential detection by hydrophones 32, 10, and then 50 would be unacceptable, as would a detector sequence 32, 50, and then 10. Simultaneous detection by 10 and 50 or 10, 32, and 50 would also be unacceptable. Simultaneous counters 90 and 92 detect the simultaneous counts occurring during the detection of signals by hydrophones 10 and 32 and hydrophones 32 and 50 respectively. If these counts do not compare then the signal is known to possibly exist within the sphere of the vessel and a pulse is produced to signal the priority logic.

The frequency analyser is shown in FIG. 6 for analysing the input frequency of the detected signals. Frequency counter 98 counts the frequency of the input signal for comparison in comparator 99 with a predetermined frequency standard for expected enemy sonar sources. Upon favorable comparison, outputs are produced for transmission to the priority logic. The output of the frequency counter is also transmitted directly to another comparator 102 and a delay device 100. The signal is then compared with itself at a later time to determine its frequency stability.

Figure 7:
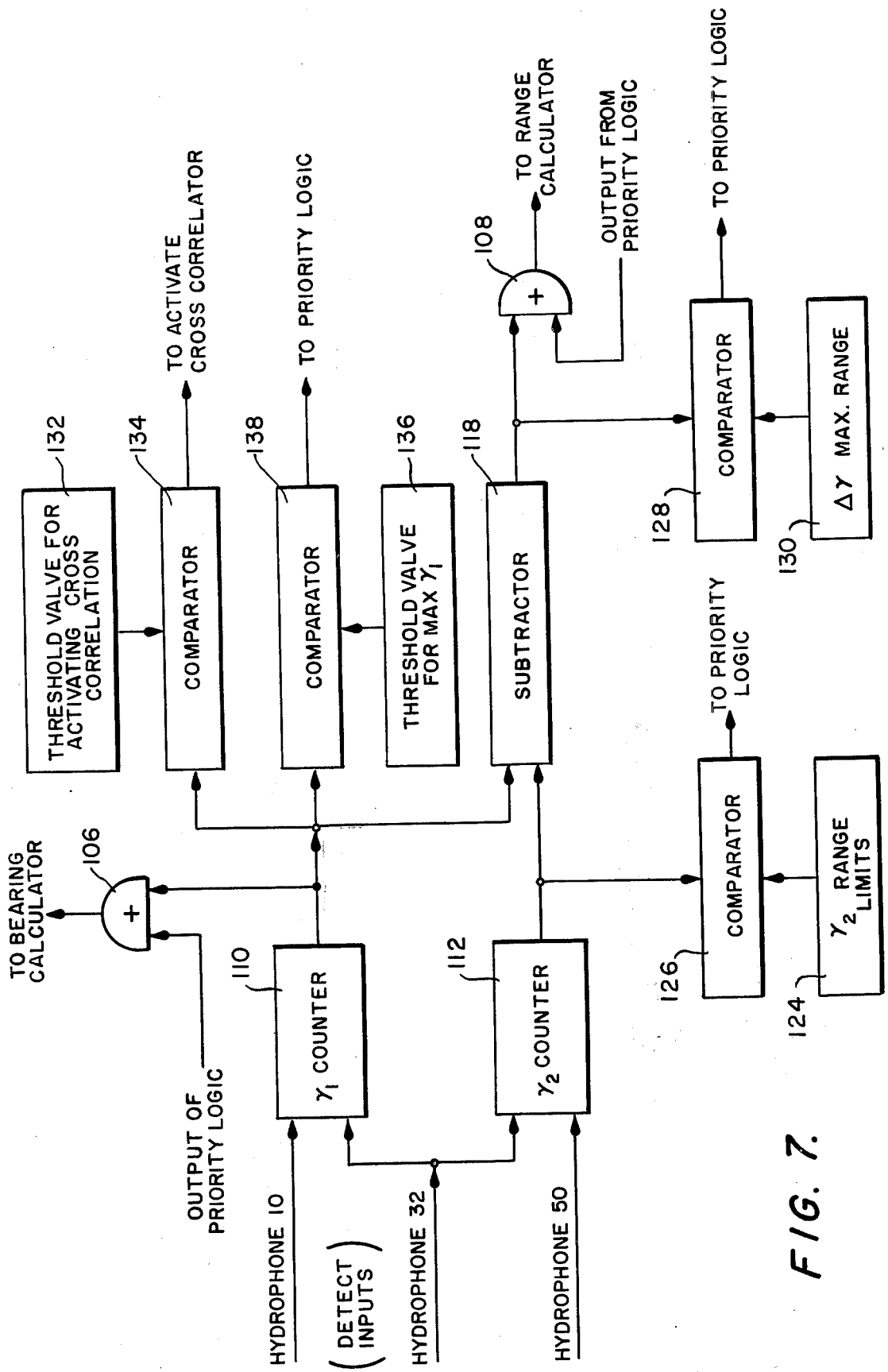
FIG. 7 is a block diagram of the remaining circuitry of the initial decision logic.

FIG. 7 discloses circuitry for carrying out various other functions of the initial decision logic circuitry. Detect inputs are supplied to $\tau_1$ counter 110 and $\tau_2$ counter 112 to count the time difference in the arrival of the detect signal between hydrophones 10 and 32 and hydrophones 32 and 50 respectively. This is achieved by activating counter 110 by the detect signal from hydrophone 10 and deactivating the counter 110 by the detect signal from hydrophone 32. Similarly, detect input from hydrophone 32 "turns on" counter 112 while detect signal from hydrophone 50 "turns off" counter 112. The count from counter 110 is directly proportional to bearing and transmitted to the range and bearing calculator 30 via and gate 106 upon receipt of an enable signal from the priority logic.

The $\tau_1$ count from counter 110 is also supplied to two comparators 134 and 138 which compare $\tau_1$ with a threshold value to activate cross correlator 28 and a threshold value to indicate whether $\tau_1$ has exceeded some maximum value to indicate that something has gone wrong with the system.

Figure 3:
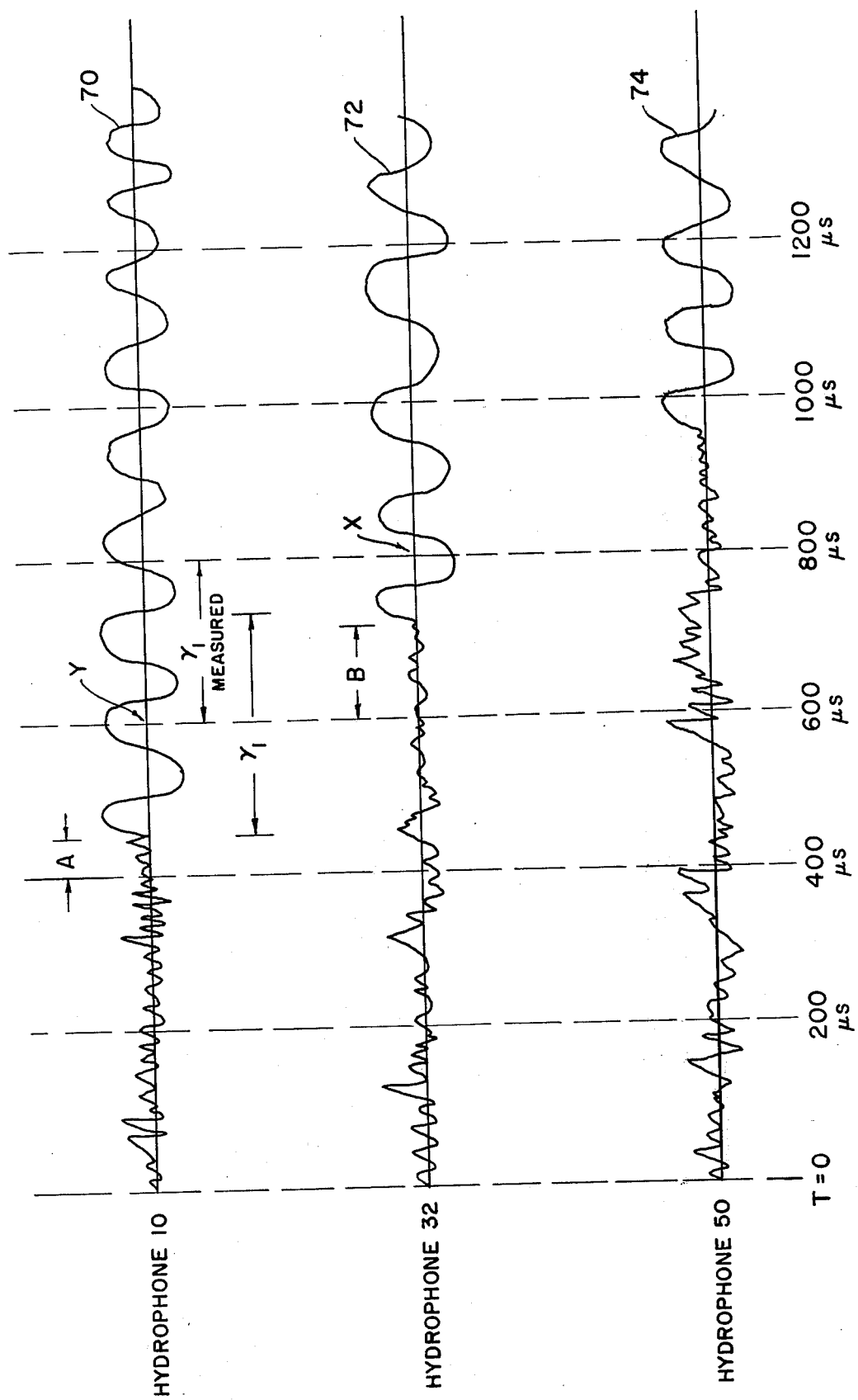
FIG. 3 is a diagram of the signals detected by the hydrophones.

To clearly understand the purpose of elements 132 and 134 reference must be made to FIGS. 2 and 3. As seen in FIG. 2, when the signal source 68 is broadside to the vessel, $\tau_1$ has a very small value. In this position, errors in $\tau_1$ render errors in bearing negligible. However, when the source 68 is located off either end of the vessel, $\tau_1$ has a larger value and slight deviations in $\tau_1$ render much larger errors in bearing. The problem becomes apparent when the operation of the present device is considered. As disclosed above, detect signals are produced at the end of a predetermined time period, e.g., 200$\mu$sec. The output signals 70, 72, 74 from hydrophones 10, 32, and 50 respectively, is shown in FIG. 3. Detect signals occur at points Y and X. The $\tau_1$ measured by counter 110 is therefore equal to 200$\mu$sec. Since the output of hydrophone 10 starts a distance A equal to approximately 50$\mu$sec interval and the output of hydrophone 32 starts a distance B equal to approximately 100$\mu$sec from a 200$\mu$sec interval, the true value of $\tau_1$ is actually equal to 250$\mu$sec as shown in FIG. 3. To correct this 50$\mu$sec error, standard cross correlation techniques are used. As shown in FIG. 7, whenever the bearing of the source exceeds a predetermined threshold as set in element 132 which exceeds the limits of allowable error, the cross correlator 28 is activated to produce $\tau_1$ and $\tau_2$ corrections. At that time, data from data storage 26, 48, 66 is fed to the cross correlator 28 for calculations as shown in FIG. 1.

The $\tau_2$ counter 112 is also compared with allowable limits set by element 124 in comparator 126. This decision is also fed to the priority logic. Both the $\tau_1$ and $\tau_2$ counts are fed to a subtractor 118 which produces a $\Delta\tau$ value directly proportional to the range of the source 68. This information is also gated to the range calculator portion of the range and bearing calculator upon being gated by element 108 when an enable signal is received from the priority logic. The $\Delta\tau$ value is also compared to a maximum value set by element 130 in comparator 128 as a further check or accuracy.

The priority logic constitutes no more than simple logic circuitry for indicating to the sonar operator whether or not a sonar signal from an enemy has been detected. Depending on the circumstances, the outputs of the devices shown in FIGS. 4, 5, and 6 may be weighted in any manner desired. For example, if each of the above criteria is considered equally important a standard "and" logic for output signals and "nand" logic for zero outputs would be suitable for use. Any combination or variation of "and", "nand", "or", or other gating logic is suitable according to the circumstances and the desired output.

Once the initial decision logic 21 has indicated the presence of either a valid target or noise, etc., the range and bearing calculator is activated by way of gates 106 and 108 as previously disclosed or the entire system is reset, respectively. In this manner, a detection signal is indicated by an output on the range and bearing display.

The present device therefore discloses a novel device for reliably discriminating between environmental noises and self produced sounds of a vessel which are similar to enemy sonar signals while providing, in addition, range and bearing information.

Obviously many modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. A device for automatically detecting and localizing sources of high frequency sonar pulses in real time both in range and bearing, comprising:

a plurality of hydrophones colinearly spaced apart parallel to the major dimension of a broad based platform for reception of narrowband sonar signals;

a plurality of auto correlation means each corresponding to a different one of said hydrophones and continuously producing detect signals upon reception of said sonar signals within said narrowband at the corresponding one of said hydrophones by convoluting said sonar signal with its mirror image;

logic means for generating a bearing signal in dependence upon the delay between the initiation of a first pair of said detect signals, for generating a pulse upon a favorable comparison of the bearing signal to a threshold value, for generating a first difference signal in dependence upon the delay between the initiation of a second pair of said detect signals, for generating a range signal in dependence upon the difference between the bearing signal and the first difference signal;

cross correlation means for generating a first correction signal in dependence upon the phase different between a first pair of said sonar signals and for generating a second correction signal in dependence upon the phase difference between a second pair of said sonar signal upon reception of said pulse; and means for calculating the range of any said sonar source in dependence upon each of said detect signals, said bearing and range signals, and said first and second correction signals.

2. The device of claim 1 wherein said logic means includes frequency comparison logic for generating an adverse signal upon the detection of frequency instability in any of said detect signals, wherein the corresponding said sonar signal is ignored by said device.

3. The device of claim 1 wherein said logic means includes circuitry for generating and adverse signal upon an unfavorable comparison of the sequence in which said detect signals occur to a selected set of sequences.

4. The device of claim 1 wherein said logic means includes a plurality of counters each adapted to receive one of said detect signals and each coupled in parallel with a comparator for generating an adverse signal upon an unfavorable comparison of the pulse lengths of said detect signals to a selected pulse length.

5. The device of claim 2 wherein said logic means for detection of frequency instability of said detect signals constitutes a frequency counter, a delay line and a comparator.

6. The device of claim 1 wherein said logic means includes a minor comparator logic circuit adapted to receive said first difference signal, for generating an adverse signal upon an unfavorable comparison of said first difference signal to a selected minimum range value.

7. The device of claim 1 wherein said logic means includes a major comparator logic circuit adapted to receive said range signal, for generating an adverse signal upon an unfavorable comparison of said range signal to a selected maximum range value.

8. The device of claim 1 wherein said logic means includes a threshold comparator logic circuit adapted to receive said bearing signal, for generating an adverse signal upon an unfavorable comparison of said bearing signal to a selected maximum bearing value.

* * * * *